US006171677B1

(12) United States Patent
Oikawa

(10) Patent No.: US 6,171,677 B1
(45) Date of Patent: Jan. 9, 2001

(54) ELECTROSTATIC FLOCKING MATERIAL METHOD OF MANUFACTURE THEREOF AND ELECTROSTATIC FLOCKING MATERIAL-CARRYING GRIP OF ARTICLE

(75) Inventor: Tooru Oikawa, Akabira (JP)

(73) Assignee: Zeom Co., Ltd., Hokkaido (JP)

( * ) Notice: Under 35 U.S.C. 154(b), the term of this patent shall be extended for 0 days.

(21) Appl. No.: 09/065,026

(22) PCT Filed: Jun. 10, 1997

(86) PCT No.: PCT/JP97/01986

§ 371 Date: Aug. 24, 1998

§ 102(e) Date: Aug. 24, 1998

(87) PCT Pub. No.: WO98/07526

PCT Pub. Date: Feb. 26, 1998

(30) Foreign Application Priority Data

Aug. 23, 1996 (JP) .................................................. 8-241358

(51) Int. Cl.$^{7}$ .............................. B05D 1/14; B05D 1/36; B32B 3/02

(52) U.S. Cl. ................................ 428/90; 428/86; 428/96; 427/200; 427/202; 427/203

(58) Field of Search ................................ 428/90, 86, 96; 427/200, 202, 203

(56) References Cited

U.S. PATENT DOCUMENTS 3,418,186 * 12/1968 Wetzel .................................. 428/90
3,956,553 * 5/1976 Palmer et al. ......................... 428/90
4,734,307 * 3/1988 Thorsrud ............................... 428/90
5,134,008 * 7/1992 Alm ...................................... 428/90
5,798,754 * 8/1998 Selker et al. .......................... 428/90

FOREIGN PATENT DOCUMENTS 3-154671 7/1991 (JP) .
6-57601 3/1994 (JP) .
6-205861 7/1994 (JP) .
60-99362 6/1995 (JP) .
08206262 8/1996 (JP) .

* cited by examiner

*Primary Examiner*—Terrel Morris
*Assistant Examiner*—Christopher C. Pratt
(74) *Attorney, Agent, or Firm*—Knobbe, Martens, Olson & Bear, LLP

(57) ABSTRACT

An electrostatic flocking material, which covers a base for a grip of an article, is coated entirely with a cover layer. Pile fibers of the flocking material are placed upright on the base, and the free ends of the pile fibers are covered with the cover layer, wherein portions of the cover layer covering the free ends of the pile fibers form peaks having multiple edges. The peaks are formed by placing an excess cover layer material on the flocking material, leveling the cover layer material, and removing part of the cover layer material between the pile fibers by wiping the leveled cover layer material with a water-absorbable fabric. The grip is usable in rainy conditions.

13 Claims, 10 Drawing Sheets

1
2
3
4
5
6
7
8
9
10

ELECTROSTATIC FLOCKING MATERIAL METHOD OF MANUFACTURE THEREOF AND ELECTROSTATIC FLOCKING MATERIAL-CARRYING GRIP OF ARTICLE

FIELD OF THE INVENTION

The present invention relates to an electrostatic flocking material exhibiting a high non-slip effect, and in particular to an electrostatic flocking material which is preferably used for a grip of articles such as sporting goods including golf clubs and tennis rackets, or tools including hammers in order to improve the non-slip function of the grip.

PRIOR ART

Since sporting goods such as golf clubs or tennis rackets are held and swung by hand, a grip thereof normally incorporates a non-slip material in order to stably play a game under severe conditions such as sweaty or rainy weather conditions. Further, a tool such as a hammer has a grip which should incorporate a non-slip function for preventing occurrence of a slip caused by sweat or grease in order to ensure safety during use. Explanation will be hereinbelow made of the non-slip incorporated in the grip of, for example, a golf club which is used under most severe conditions.

Heretofore, there have been proposed various kinds of non-slip materials for a grip. For example, Japanese Laid-Open Patent No. 6-205861 discloses a rubber or synthetic resin covering material adapted to be applied on a grip, in which countless micro-concavities and -convexities are formed so as to increase the frictional coefficient of the material in order to enhance the non-slip effect, in particular, in a rainy weather condition.

Further, Japanese Laid-Open Patent No. 6-57601 discloses a technology relating to a non-slip member in which fibrous material such as polyurethane elastic yarns are braided, which is adapted to be applied to a grip, and which is excellent in stretchability.

By the way, the above-mentioned conventional grips have offered the following disadvantages. That is, as to a structure such that concavities and convexities are formed in a rubber cover material of a grip as disclosed in Japanese Laid-Open Patent No. 6-205861, although it can increase the frictional coefficient in comparison with normal grips, this rubber cover material (or seal fabric) even having convexities and concavities becomes slippery or sticky if the grip is wet with rain water or sweat, and accordingly, normal (ideal) swings cannot be made. Thus, this cover material cannot exhibit sure non-slip effect at a high degree of possibility. Further, from this reason, the higher the level of technique of a player (professional), the higher the trend of disliking the rubber material formed with concavities and convexities (non-slip member), many player have used a glove in order to cope with this slippery problem).

Meanwhile, as to such a technology that fibrous materials are braided and incorporated in a grip as disclosed in Japanese Laid-Open Patent No. 6-57601, although it is effective for application to a glove (or gloves), socks or the like, the braided knits are shifted upon swinging so that hindrance to playing is possibly caused although a certain effect can be expected for slipping caused by rain water or sweat if it is used for a grip of a golf club or a tennis racket.

It is noted that pile (fine fibers electrostatically flocked) exhibiting point contact with respect to the palm of a hand is effective for increasing the frictional coefficient of a grip in order to improve the touch and to surely prevent occurrence of a slip caused by rain water or sweat. However, such pile has offered such a problem that the pile comes off after the repetitions of hitting by several thousand times since a severe external force is applied to the grip of a golf club.

An object of the present invention is to propose an electrostatic flocking material which is subjected to electrostatic flocking, which can surely prevent occurrence of a slip caused by rain water or sweat, and which can maintain satisfactory touch obtained upon gripping by a hand, for a long time, a method of manufacture the material, and a grip for articles, incorporating the material.

DISCLOSURE OF THE INVENTION

To the end, according to he present invention, there is provided an electrostatic flocking material subjected to electrostatic flocking, characterized by a covering layer covering over the entire surface of the material and having edges at the front end part thereof. Further, according to the present invention, the electrostatic flocking material is made of fibrous pile preferably having a fiber cross-sectional diameter of 10 to 40 deniers and a length of 0.3 to 0.8 mm.

Further, there is provided a method of manufacturing an electrostatic flocking material, characterized by the steps of subjecting a surface of a base material composed of an elastic resin layer to electrostatic flocking after the base material is coated over its surface with an adhesive, then subjecting the surface thereof a coating process so as to form a covering layer, subsequently brushing the surface so as to make the wall thickness of the coating layer uniform, and wiping the surface with the use of an water-absorbable fabric so as to form edges in the covering layer at the front end of the flocking material.

Further, the present inventions there is provided a grip for an article, comprising an elastic resin layer surrounding at least a part of a body part of the article, and an electrostatic flocking material with which the outer surface of the elastic resin layer is covered, wherein the electrostatic flocking material is provided with a covering layer with which the outer surface of the electrostatic flocking material is covered in its entirety, and which has edges at the front end part of the flocking material. The electrostatic flocking material is composed of fibrous pile having a fiber cross-sectional diameter of 10 to 40 deniers, and a length of 0.3 to 0.8 mm.

Further, the articles prescribed by the present invention include sporting goods such as golf clubs or tennis rackets, and tools such as hammers, but may also include steering wheels in automobiles, and all of those gripped by the hands.

BEST MODE FOR CARRYING OUT THE INVENTION

Figure 1:
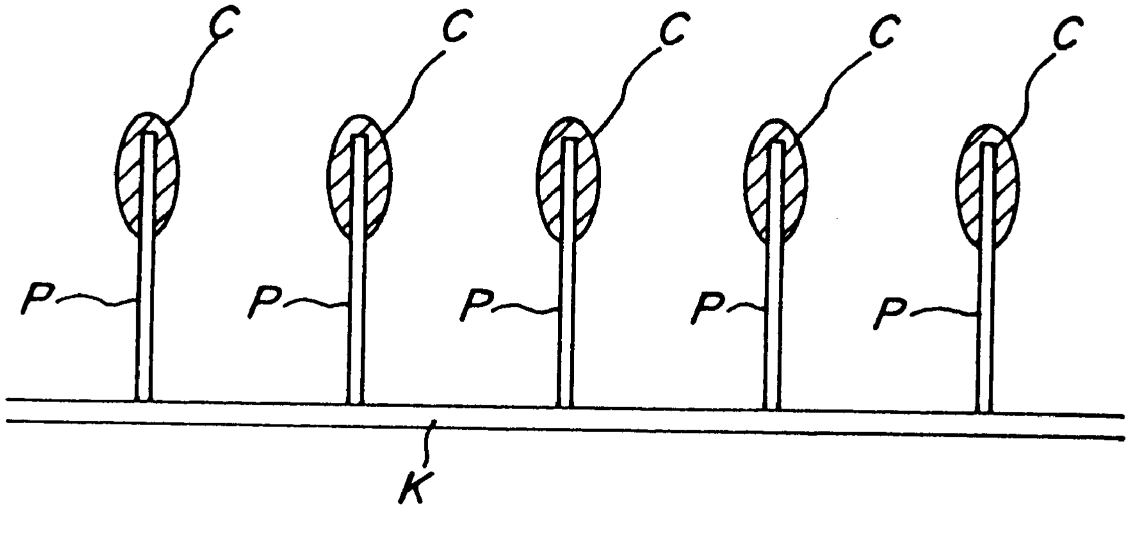
FIG. 1 is a view showing a condition in which a coating material is sprayed onto an electrostatic flocking material.

An electrostatic flocking material incorporates a coating material (hard resin layer having an acute angle) covering the overall surface of the material and having edges at the front end part of the material, and accordingly, the material has an extremely high frictional coefficient, and accordingly, the material is rough to the touch when a hand touches it. The hard resin with which the flocking material is covered is a coating material, and its inherent roundness is removed, thereby there is no such a risk that the skin is harmed.

The electrostatic flocking material constituted as mentioned above, is provided to the outer surface of elastic resin surrounding at least a part of a body part of an article, through the intermediary of an adhesive so as to form a grip, and accordingly, the gripping performance of the grip is remarkably improved.

If the elastic resin layer is subjected to electrostatic flocking by setting a fiber cross-sectional diameter to 10 to 40 deniers, and a length to 0.3 to 0.8 mm, it has an extremely high frictional coefficient which is rough to the touch when a hand touches it in such a case that the material is applied to a grip of an article. However, it is inevitable that the pile comes off during a long time use thereof. Thus, the splaying application of the coating material onto the outer surface of the material is effective for aiming at preventing the pile from coming off. However, in this case, the material become soft to the touch when a hand touches it, resulting in such a trend that a king of slippery touch becomes larger.

The is because particles of the coating material cannot reach the inward part of the pile, that is, a base K on which flocking pile is planted, so that the coating material C seems to be solidified in a rounded shape at the front end of the flocking pile p even though the coating material is sprayed from the outer surface thereof since the pile is formed of fine fibers which are densely planted. It has been tried that the coating material is sprayed by forcing approach to the surface of the flocking material in view of this point. However such a countermeasure cannot satisfactorily enhance the pile come-off preventing effect since the coating material is impregnated and fixed in the pile from the front end thereof, although the coating material can reach the base, and accordingly, the effect of application of flocking becomes meaningless. Thus, according to the present invention, the material having been subjected to electrostatic flocking is formed with a covering layer (coating layer) with which the its entire surface of the material s coated, and which has edges at the front end part of the material.

It is highly desirable to apply the electrostatic flocking technology to a grip of an article, such as a grip of sporting goods including golf clubs or tennis rackets, or tools such as hammers, that is, the grip part of the article upon which the slip condition severely reflect as a result. Through the application to such an article, no slip occurs when force is applied in a rainy weather condition even though no glove is worn, and further, since it is soft to the touch when a hand grips it, the quality thereof is remarkably improved in comparison with a conventional one.

Next, explanation will be made of a specific form of the present invention with reference to the drawings, in which the present invention is applied particularly to a grip of a golf club as an example.

Figure 2:
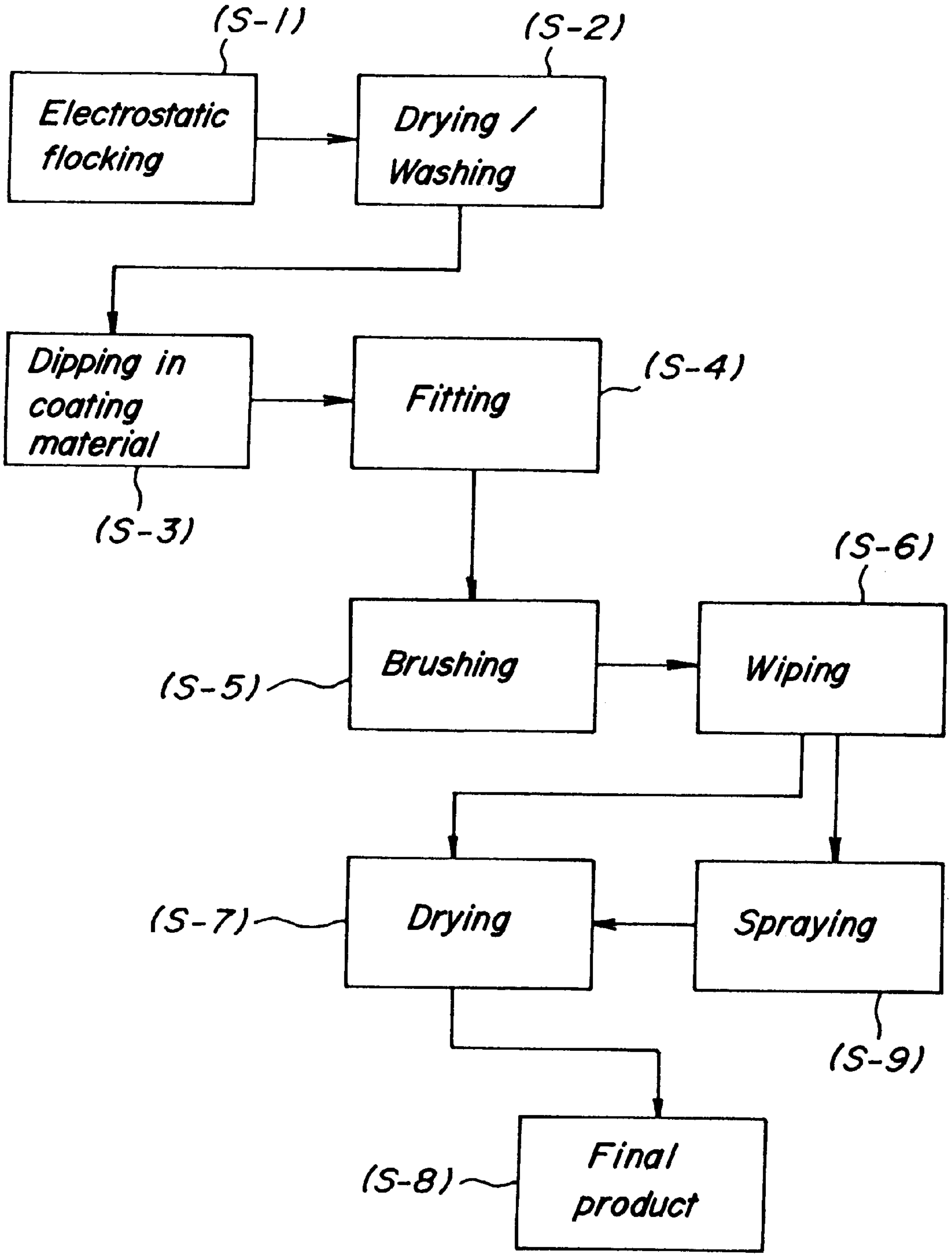
FIG. 2 is a view showing a flow of the process of manufacturing an electrostatic flocking material according to the present invention.

FIG. 2 shows the flow of an entire process of manufacturing a grip according to the present invention. Further, FIGS. 3*a* to 3*f* schematically show an electrostatic flocking process. In a process of manufacturing an electrostatic flocking material, at first, a base formed of an elastic resin layer (elastic resin such as rubber as a base) is coated over its outer surface with an adhesive at S-1 in FIG. 2, and is thereafter subjected to electrostatic flocking.

Referring to FIGS. 3*a* to 3*f*, there are shown a golf club body 1, an elastic resin layer (which will be hereinbelow denoted as "base") 2 which constitutes a grip provided at one end of the golf club body 1, and which is made of rubber or other resin materials.

Further, there are shown a rotary brush formed of, for example, wires, pile 4, a casing 5 accommodating the pile 4, a vibrator 6 for vibrating the casing 5, a net 7 for evenly dropping the pile 4, a heater 8 for drying the pile after flocking together with the base 4, a cooling air nozzle 9 and a water tank 10.

Figures 3A, 3B, 3C, 3D, 3E, 3F, 3G:
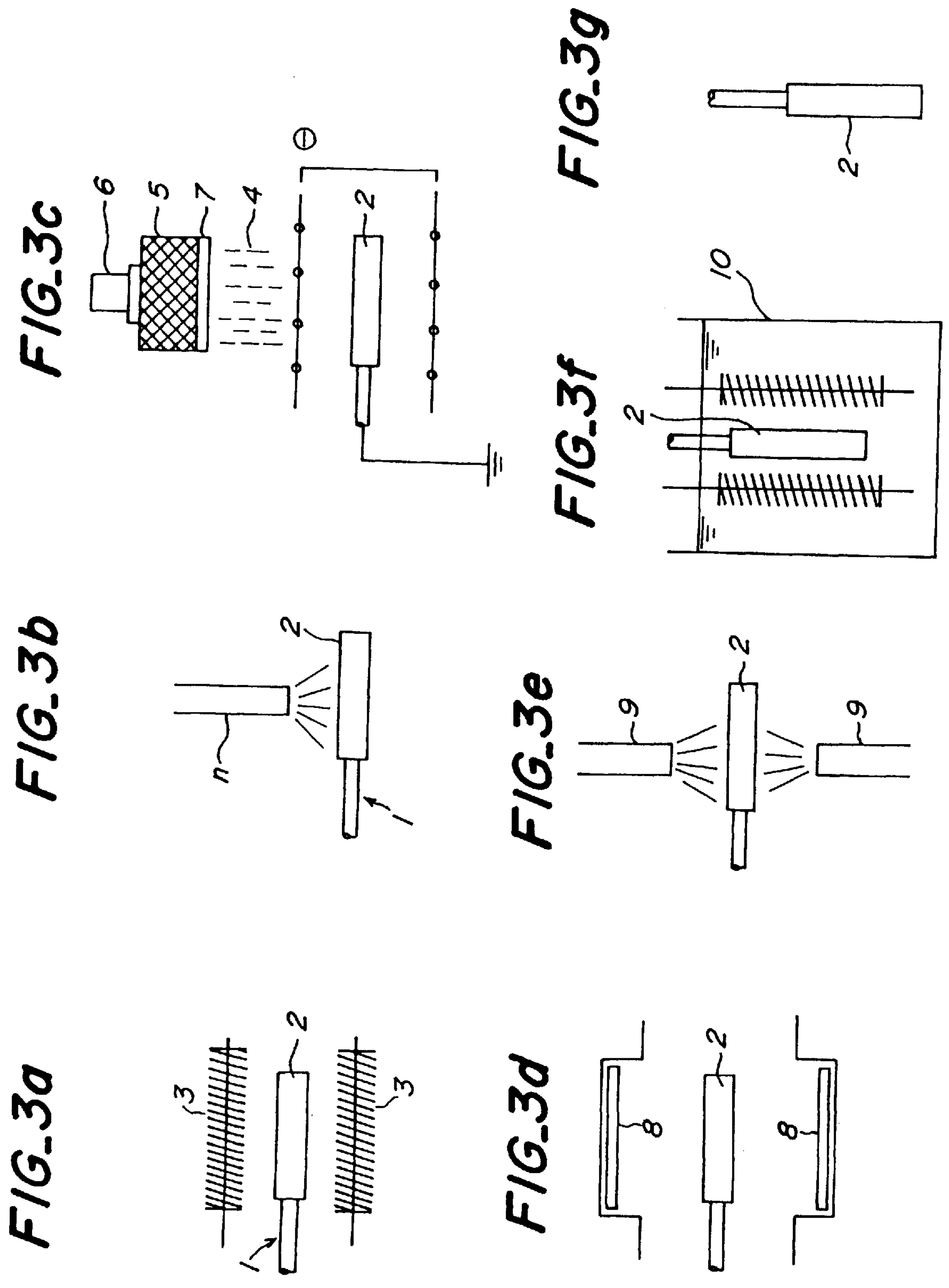
FIG. 3(*a*) to 3(*g*) are views showing steps of applying the electrostatic flocking material to a rubber base.

At first, the outer surface of the base 2 is polished by the rotary brush 3 in the process shown in FIG. 3*a*, in order to increase the coating area of the adhesive. Then, the base 2 is coated over its polished outer surface with a primer (chlorine group vulcanizing agent or the like). The coating of the primer can be made by dipping in the primer or by splaying the primer, and should not be limited to a specific one.

Next, the outer surface of the base 2 is applied thereover with an adhesive through the nozzle n as shown in FIG. 3*b*. The adhesive used in this process should be selected in consideration with expansion when the base 2 is fitted on the grip end of the golf club body 1, and accordingly, polyester group urethane rein emulsion or the like which can follow up the expansion may be used. It should not be limited to this material, but any kind of materials which can satisfies the above-mentioned term, may be used.

Next, referring to FIG. 3*c*, the pile 4 is planted to the outer surface of the base 2 while the base 2 is rotated in electrolysis. The flocking system shown in FIG. 3*c* is the so-called down-system. Normally, an up-down system in which the pile 4 is planted from above and below, is desirable, but if the weight per piece of the pile is large, it is difficult to evenly set the density of the pile 4. Accordingly, it is considered that the down-system is desirable in the present invention. Although the vibrator 6 is used as a means for evenly setting the spray density of the pile in this invention, it should not be limited to the vibrator 6. A feed device such as a pinch roller or the like may be used therefor.

Figure 4:
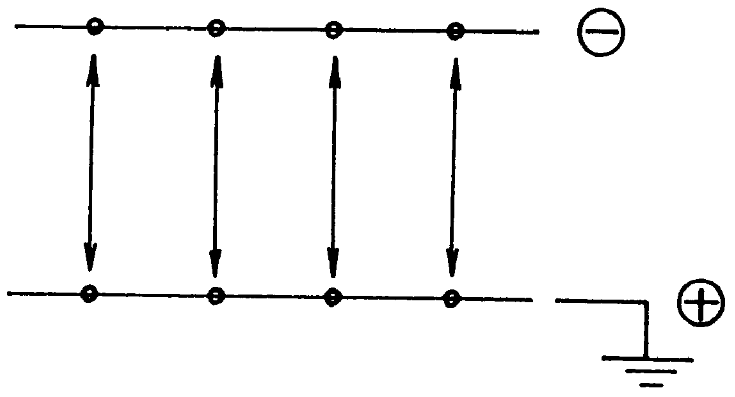
FIG. 4 is a view showing a principle of electrostatic flocking.
Figure 5:
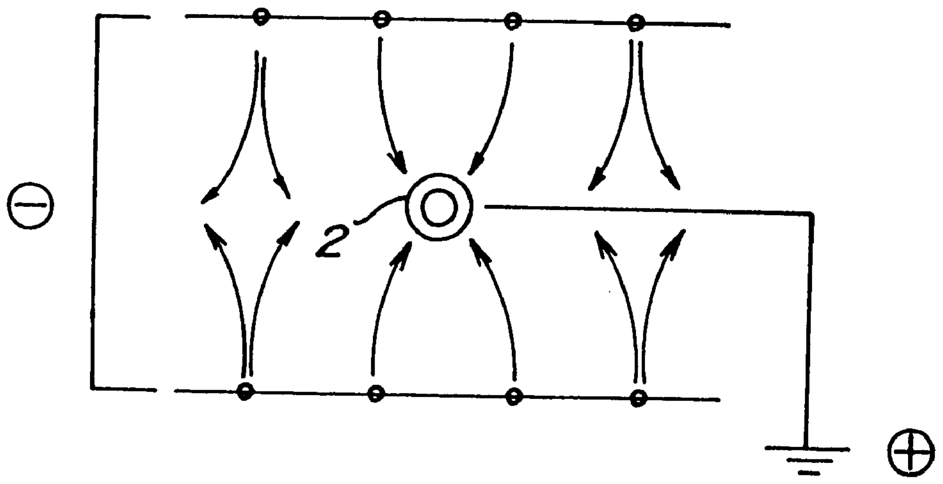
FIG. 5 is a view showing a process of electrostatic flocking according to the present invention.

During normal electrolytic flocking, the pile is planted by a Coulomb force between a positive pole and a negative pole as shown in FIG. 4. Since the base 2 normally has a substantially cylindrical shape, the base 2 should be subjected to flocking around the substantially overall periphery (360 deg.) thereof. In order to maximize the circulation of the pile 4, a ground positive pole is generated at one side of the base 2 as shown in FIG. 5, so as to utilize a repulsion force between a positive pole and a negative pole. In the case of using such a repulsion force, the pile 4 scatters so as to cause a working environment to deteriorate. Thus, in order to avoid deterioration of the working environment, it is preferable that the base 2 is rather rotated while the flocking is carried out with the use of gravitation in order to prevent the pile 4 from scattering.

After the base 2 is subjected to electrostatic flocking, the base 2 is dried by the heater 7 as shown in FIG. 3*d*, and then, after it is cooled by cooling air from the air nozzle 9 as shown in FIG. 3*e*, it is brushed in the water tank W as shown in FIG. 3*f* so as to remove residual pile which has not yet been stuck, and dust from it (at S-2 FIG. 2), thereby a final produce as shown in FIG. 3*g*, can be obtained.

It is noted that the drying process as shown in FIG. 3 is carried out in order to dry the adhesive, but the conduction of heat to the adhesive applied to the base 2 differs in dependence upon a size (fiber cross-sectional diameter) of the pile with which the outer surface of the base 2 is covered. From the results of experiments, the thinner and the shorter the pile 4, the higher the conduction of the heat, and accordingly, such an inconvenience that air bubbles are produced between the outer surface of the base 2 and the adhesive and so forth occurs. In order to eliminate such inconvenience, it is desirable to carry out the heat treatment through two stages in such a case the pile 4 to be planted is particularly thin.

It is difficult to univocally set the process time during drying, since the thermal conductivity of the pile is different among kings of the pile. For example, if nylon group pile having a fibrous cross-sectional diameter of 14 deniers, and a length of 0.4 mm is used, a first drying process (primary cure) and a second drying process (secondary cure) are preferably carried out with an interval therebetween in order to surely stick the pile to the base 2.

In the case of thin pile having a fibrous cross-sectional diameter of 12 to 15 deniers, and a length of about 0.3 to 0.6 mm, the primary cure is carried out at a temperature in a range from 80 to 100 deg.C., for 5 to 10 minutes, and an interval is set. The interval is around a clock, or 15 minutes with forced blowing of cold air if the atmospheric temperature is low during the winter season or the like. As to the secondary cure, the heat treatment is carried out for 20 to 30 minutes at a temperature in a range from 135 to 150 deg.C.

The above-mentioned term can be suitably changed in accordance with the material and the length of the pile, and a king of an adhesive. Further, the temperature so of the first and second cures can be freely changed in a range in which the flocking pile is damaged, in order to exclusively shorten the process time.

Next, in order to form a cover layer through a coating process for the outer surface of the elastic resin layer subjected to the electrostatic flocking, a flocking material is dipped together with the elastic resin layer in a solution of a coating material at a step S-3 next to step S-2 shown in FIG. 2 so as to cause the coating material between micro gaps among the plated pile in order to improve the frictional characteristic of the electrostatic flocking material since this frictional characteristic can be improved only by edging the coating material applied over the outer surface of the pile. It is noted that a vinyl chloride adhesive, in particular, an urethane group resin is desirably used as the coating material.

Figure 6:
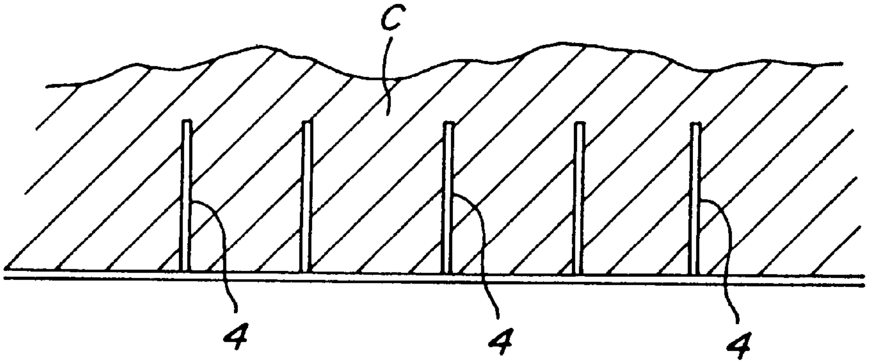
FIG. 6 is a view illustrating a section of a coating layer just after it is picked up from a solution of the coating material.

Further, just after the flocking material is picked up from the solution of the coating material, the outer surface of the pile 4 in its entirety is squeezed by, for example, a hand at step S-4, and accordingly, the coating material c is caused to penetrate into gaps in the pile 4 as shown in FIG. 6.

Figure 7:
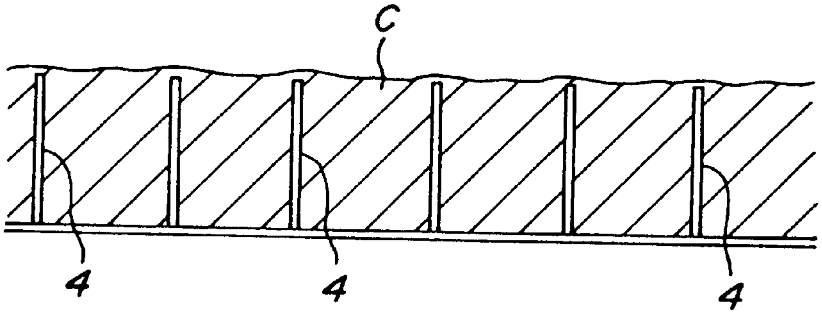
FIG. 7 is a view showing a coating layer in a condition in which it is subjected to brushing.
Figure 8:
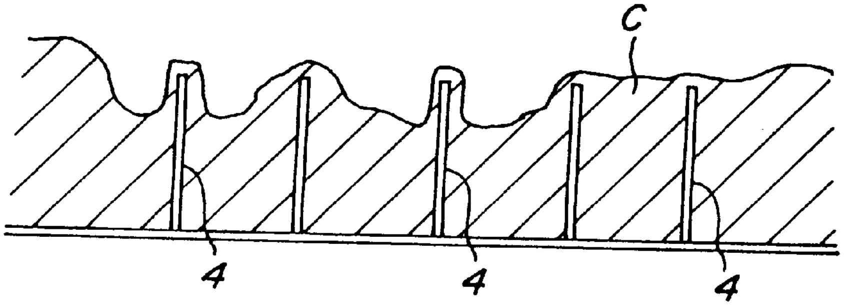
FIG. 8 is a view showing a section of the coating layer in such a condition that the wipe-off of the coating layer is insufficient.

At the next step S-5, as shown in FIG. 7, the thickness (wall thickness value) of the applied coating agent C is made to be uniform by brushing. This process is extremely important in the present invention because the edge cannot be finally formed at the front end part of the pile if concavities and convexities of the coating material c are present on the outer surface of the pile as shown in FIG. 8.

After brushing, the procedure is shifted to step S-6 at which the coating material c is wiped off by a fabric such as a water-absorbable towel fabric. Since extra resin remains at the front end of the pile due to the presence of concavities and convexities of the coating material c even if the coating material is wiped off without through this step, the cover layer having edges cannot be formed.

Figure 9:
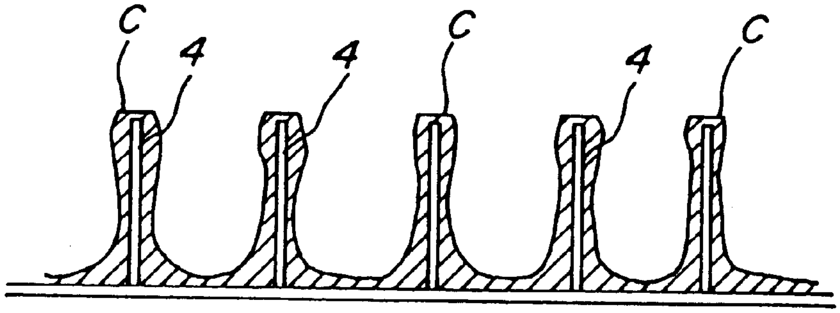
FIG. 9 is a view showing a section of the electrostatic flocking material according to the present invention.
Figure 10:
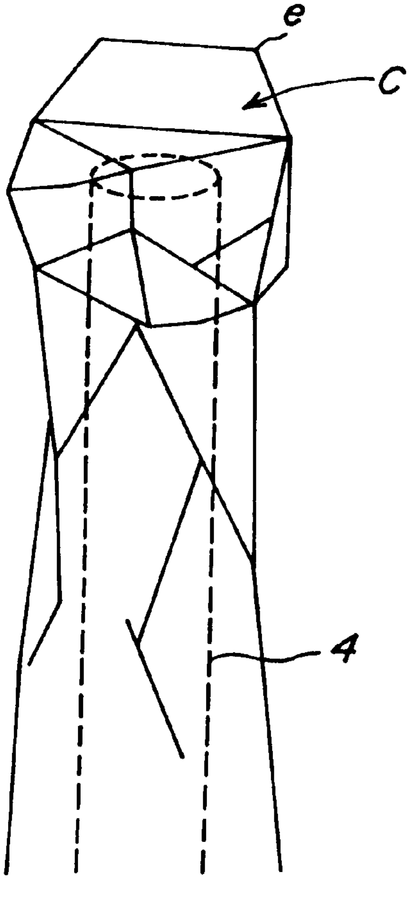
FIG. 10 is an enlarged view illustrating an essential part in FIG. 9.

Meanwhile, after the thickness of the coating material c is made to be uniform, when an water-absorbable fabric is applied thereto so as to suck up the solution, since the coating material c remains from the base part of the pile 4 to the front end thereof, the pile 4 stands always upright while the coating material c remaining at the front end part of the pile is not rounded, and accordingly, a well-balanced edge as shown in FIG. 9, can come out. The reason of this is considered to be such that the resin more than cannot be sucked remains at the front end of the pile 4 when the when the coating material c is sucked up. The shape of the resin at the front end of the pile is conceptionally such that there are a plurality of edges e as shown in FIG. 10. This shape can be found with the use of a magnifier.

Figure 11:
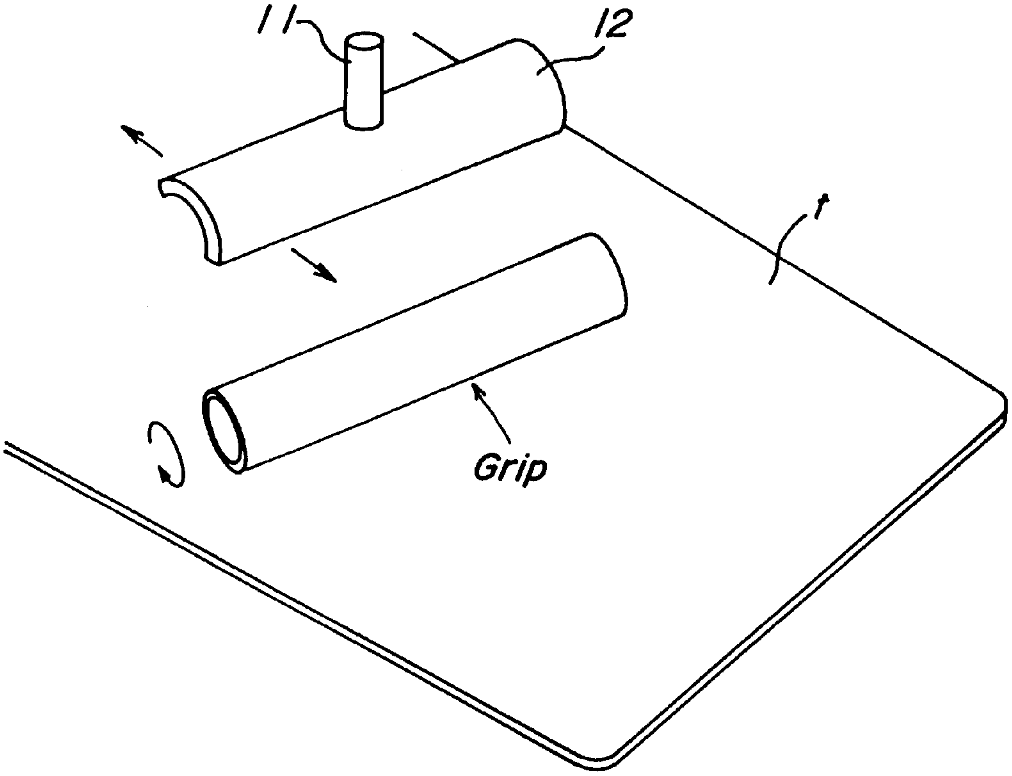
FIG. 11 is a view showing a condition in which the coating material is wiped off by using a cylindrical base.

The grip is usually cylindrical, and accordingly, in order to wipe off the coating material c from the grip having a such a shape, it is preferable to roll the grip on a towel t as shown in FIG. 11 so as to wipe off the coating material c. At this stage, by using a semi-cylindrical member 12 having a handle 11, the manufacturing process can be simplified.

Step S-4 incorporates the squeezing process by a hand or the like in order to cause the coating material c to penetrate into gaps in the pile 4.

Figure 12:
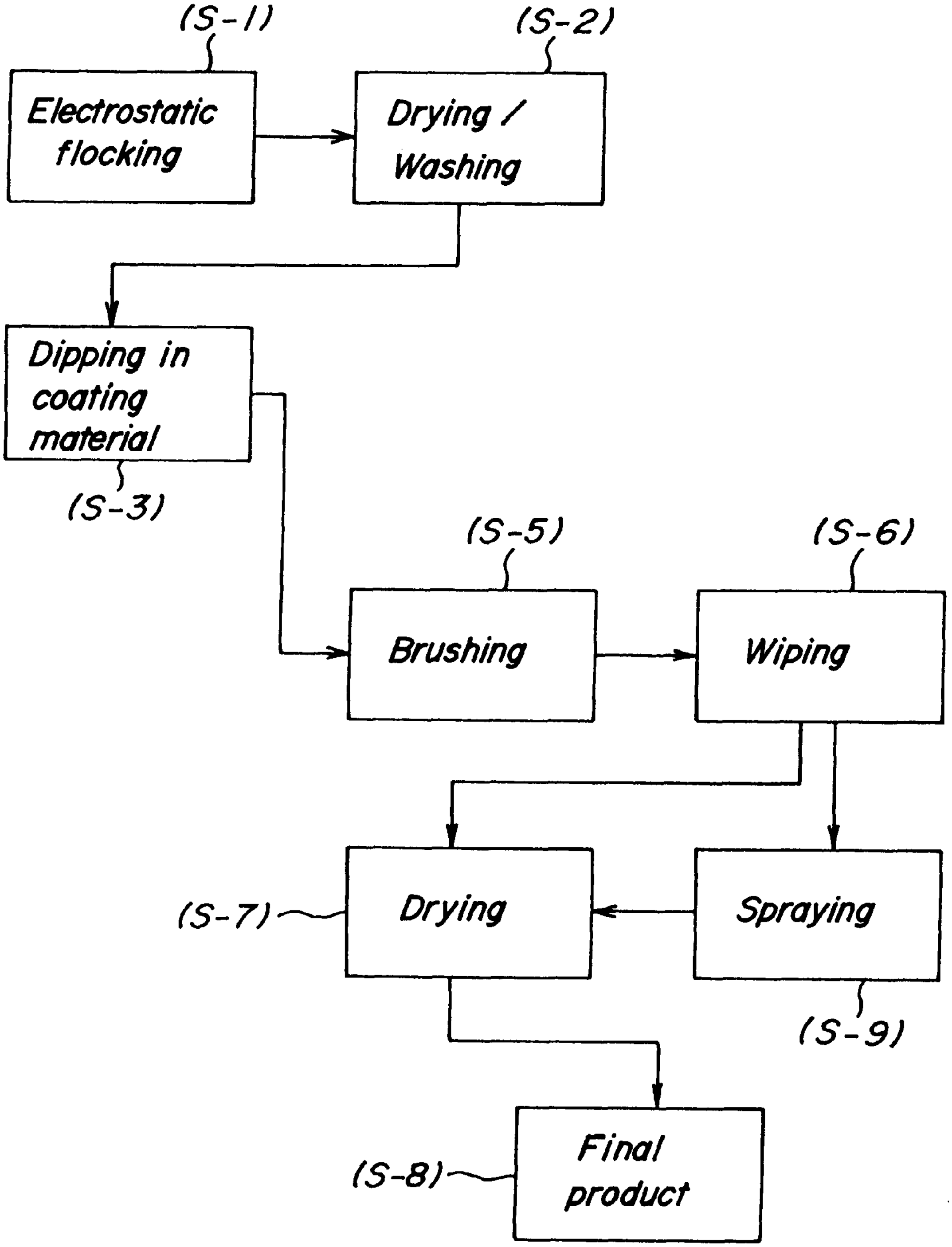
FIG. 12 is a view showing another process of electrostatic flocking according to the present invention.
Figure 13:
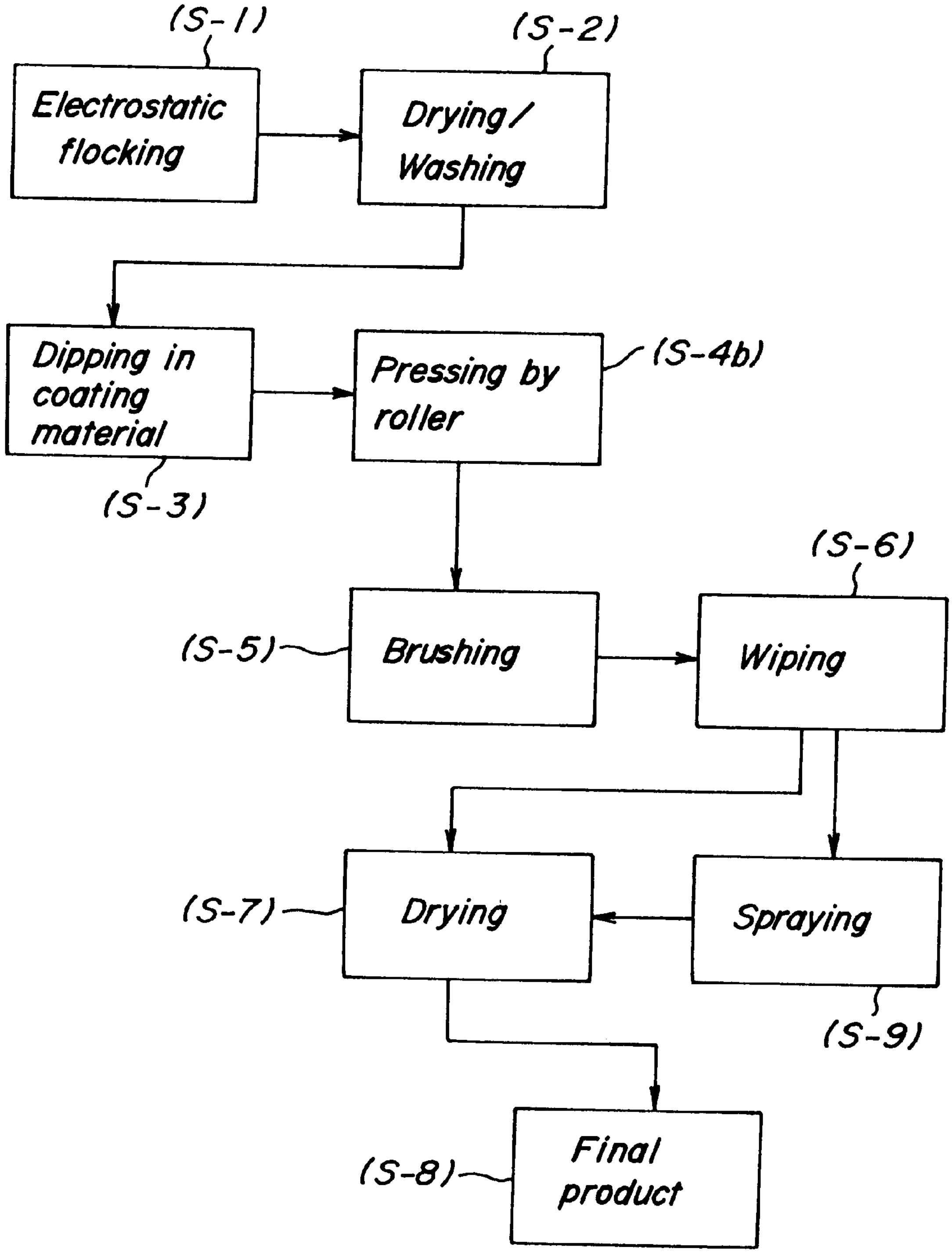
FIG. 13 is a view illustrating another process of electrostatic flocking according to the present invention.

However, the step of causing the coating material c to fit to the pile 4 should not be limited only to the above-mentioned step. For example, at next step S-5, the brushing is carried out, if conditions such as a contact pressure and a moving speed (rotational speed) during brushing, or the thickness of fibers constituting a brush, can meet the flocking density or the like of the pile, the coating material c can be fitted only by brushing. At this stage, it is important to carry out the brushing at once as shown in FIG. 12 after the coating process (after the pile is dipped in the coating solution and is picked therefrom), and so doing, the coating material can be fitted, and simultaneously, a uniforming process can be carried out. In order to fit the coating material c to the pile, a process using a pressing means such as a rotary roller may be carried out. The flow of this process is shown in FIG. 13. In particular, unmanned manufacturing (automation) can be made by following the process as shown in FIG. 13.

Through the above-mentioned process, the grip having an elastic resin layer and a cover layer made of the coating material with which the overall outer surface of the electrostatic flocking material is covered, as shown in FIG. 9, can be manufacture. In this grip, the root part of the pile can be surely restrained by the cover layer c, and accordingly, it is possible to prevent the pile 4 from simply coming off even though the grip is used for a long time. Further, since no cover layer is present between the pile 4, except the outer surface of the elastic resin layer, the motion of the pile 4 is not limited. Further, although the cover layer remaining at the front end part of the pile 4, has shapes and angles which are not always coincident with one another, edges effective for enhancing the frictional resistance can be formed.

Through step S-7, the final product can be obtained at step S-8, and the coating material may be sprayed onto the outer surface of the pile at step S-9 whenever it is necessary.

Figure 14:
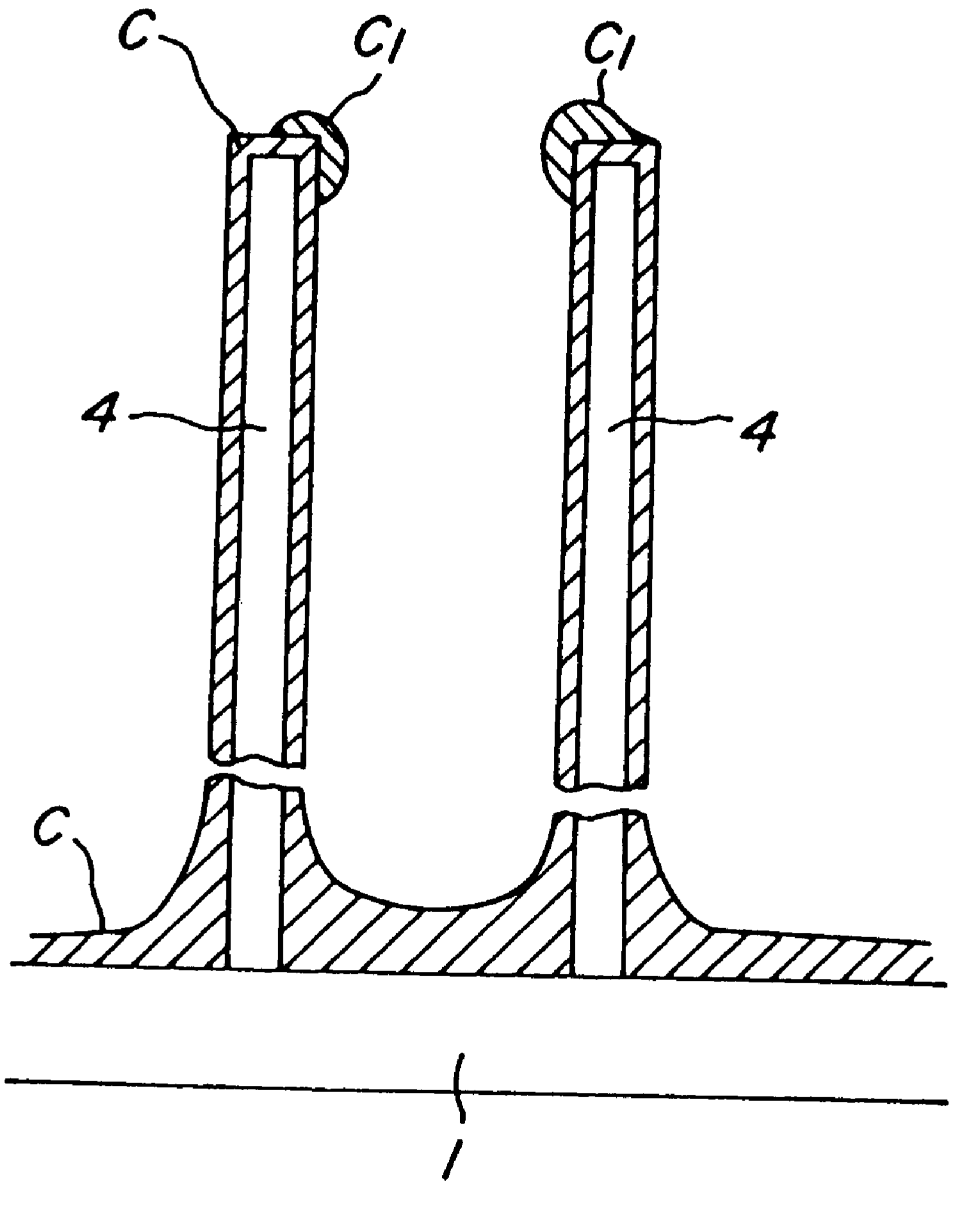
FIG. 14 is a view showing a condition in which a coating material is sprayed onto the outer surface of an electrostatic flocking material according to the present invention.

Thus, at the final stage, when the coating material is sprayed, a rounded resin block C1 as shown in FIG. 14, is formed at the front end of a part of the pile 4, and accordingly, the touch (soft touch) when touching it by a hand, can be enhanced. In this case, as to the resin, it is sufficient to apply a resin material which is softer than the cover layer c formed on the outer surface of the pile 4 by a trace quantity, and finally, through spraying application of the coating material by a trance quantity, it is applicable for a grip adapted to be used by a person whose skin is susceptible to damage, a grip which requires a delicate touch, or the like.

In the present invention, the fibrous pile as an electrostatic flocking material, has a fibrous cross-sectional diameter of 10 to 40 deniers and a length of 0.3 to 0.8 mm. The reason why it is will be explained below.

If the thickness and length of the pile exhibit a gripping touch which greatly differs if they are different even though the difference is numerically slight in the case of application of the pile to a grip for sporting goods or the like. It is because the touch of the front end of the pile feels through the entire palm of a hand. The smaller the cross-sectional diameter of the pile, the higher the flocking rate, a velvet-like touch can be obtained, The touch at the hand becomes smooth but the frictional coefficient becomes smaller, and accordingly, the high non-slip effect cannot be expected. On the contrary, if the pile has a large thickness, coarse touch is exhibited so as to deteriorate the fitting touch. Further, if the length of the pile is too short, a roughing touch is exhibited. Meanwhile if it is too long, there is exhibited such a touch that a hand shakes since the fibers bend.

The surface subjected to electrostatic flocking fall in such a condition that the pile stands up, that is, the surface gives a touch which is figuratively the same as that of a carpet. If the length of the pile is too short, the above-mentioned roughing touch is exhibited so that a sufficient non-slip effect cannot be obtained. On the contrary, if it is too long, the direction of force of the pile direct planted is inclined (bent) so that point contact is changed into surface contact, and accordingly, a complete fitting touch cannot be surely obtained in the case of application to a grip such as a grip of a golf club. Accordingly, in the present invention, the pile is set up such that the fibrous cross-sectional diameter is 10 to 40 deniers, and the length is 0.3 to 0.8 mm (preferably less than 0.6 mm). Further, it is preferable that the fibrous cross-sectional diameter is about 10 to 20 deniers, more preferably less than 30 deniers.

By satisfying the above-mentioned conditions, a sure non-slip effect can be held while the fitting touch can be surely enhanced. If a chemical powder is used being mixed with the flocking pile, lamellas are visible being distributed over the overall surface of the grip. If gold or sliver lamellas are embedded, there is exhibited such an advantage that dirt due to dust, sweat or grease can be prevented from being accentuated.

The touch (fitting touch) obtained when gripping a grip, is different from a person to a person, or in dependence upon a king of a sporting game. For example, in the case of a golf club, it is considered that the pile has, most preferably, a fibrous cross-sectional diameter of about 14 deniers, and a fiber length of about 0.5 mm since grip having a pile satisfying the above-mentioned condition, does not slip even though a hand is wet with water, and a precise shot can be made. The material of the pile should not be limited to a specific one. That is, for example, nylon, polyester, acrylic or polyurethane may be used therefor.

The base 2 subjected to the final step, is fitted on the body part (grip end) of a golf club, and accordingly, a grip incorporating an electrostatic flocking material is completed. Since the inner diameter of the base 2 expands by about 5% thereof when the base 2 is fitted onto the body part of the golf club, the adhesive for fixing the flocking material to the base 2, is a copolymerized urethane group adhesive which can spread following an elongation of a coated surface, and accordingly, the pile is prevented from simply coming off. In the case of the application of the grip having the above-mentioned structure to a golf club, since rain drops penetrate into gaps in the pile 4 while the palm of a hand gripping the grip is supported by the front end of the pile 4, the grip does not slip even in a rainy weather condition, and accordingly, the fitting touch is prevented from deteriorating.

In the present invention, golf clubs and tennis rackets have been exemplified sporting goods. However, it goes without saying that the present application is applicable for baseball bats (including metal bat) or badminton rackets. Although it is rare that elastic resin is applied to the grip of a woody baseball bat, the present application can be applied to the woody baseball bat since the application of rubber thereto causes the grip to hardly slip. Further, in such a case that bats are frequently replaced as for a professional baseball player, although it is not always necessary to use elastic resin (rubber film or the like) as a base material, even if the pile is directly stuck and fixed to the outer surface of the grip of a woody bat, a non-slip effect can be expected.

Although explanation has been made such that the base 2 as an elastic resin layer to be subjected to electrostatic flocking is cylindrical in the present invention, it goes without saying that a sheet-like elastic resin layer may be at first subjected to electrostatic flocking, and thereafter, it may be formed into any of various kinds of grips.

INDUSTRIAL USABILITY

According to the present invention, an electrostatic flocking material having a diameter and a length suitable for a base, is formed so as to increase the density thereof in order to aim at improving the gripping function. With this arrangement, it is possible to prevent occurrence of a slip caused by rain drops and sweat. Further, since the electrostatic flocking material according to the present invention, is covered over its entire surface, including the base, with the elastic resin layer, and accordingly, fur can be prevented from coming off even after using for a long time. Further, since the root of the material (pile) is firmly fixed, the material always stands upright, and since the resin layer has edges, the touch upon gripping is satisfactory, thereby it is possible to surely prevent occurrence of a slip.

What is claimed is:

1. A method of manufacturing an electrostatically flocked handle for gripping of goods or tools, comprising the steps of:

subjecting a base which comprises an elastic resin layer coated with an adhesive, to electrostatic flocking to form a flocking layer comprising pile fibers on the adhesive side of the base, wherein the pile fibers are bound upright to the base;

entirely covering the upright pile fibers on the base with a plastic covering material to form a cover layer;

leveling the cover layer by removing any excess of the covering material above the pile fibers by brushing; and removing part of the covering material between the pile fibers by wiping the leveled cover layer with a water-absorbable fabric to form peaks and valleys in said cover layer between the pile fibers, said peaks having multiple edges at the unbound ends of the pile fibers.

2. The method according to claim 1, wherein the coating material is a vinyl chloride adhesive.

3. The method according to claim 2, wherein the vinyl chloride adhesive is a urethane group resin.

4. The method according to claim 1, further comprising a step of drying the wiped cover layer.

5. The method according to claim 4, further comprising a step of spraying the wiped cover layer with the coating material prior to the drying step.

6. The method according to claim 1, wherein said electrostatic flocking material is made of fibrous pile having a fibrous cross-sectional diameter of 10 to 40 deniers and a length of 0.3 to 0.8 mm.

7. The method according to claim 1, further comprising a step of placing the base around a substrate body adapted to be clasped by a hand, prior to the electrostatic flocking step.

8. The method according to claim 7, wherein the substrate body is a golf club grip body.

9. The method according to claim 7, wherein the substrate body is a hammer grip body.

10. A hand grip of an article, comprising:

an elastic base coated with an adhesive;

an electrostatic flocking material applied onto the adhesive side of the base, wherein the flocking material comprises pile fibers bound upright to the adhesive; and a resin layer entirely covering the pile fibers and the base, wherein peaks and valleys are formed with the resin layer covering the pile fibers, said peaks having multiple edges formed by wiping an excess resin layer material for the resin layer with a water-absorbable fabric when forming the peaks and valleys.

11. A hand grip of an article as set forth in claim 10, wherein said electrostatic material is made of pile fiber having a diameter of 10 to 40 deniers, and a length of 0.3 to 0.8 mm.

12. A hand grip of an article as set forth in claim 10, wherein said article is selected from the group consisting of sporting goods and tools.

13. The hand grip according to claim 12, wherein the article is a golf club, tennis racket, or hammer.

* * * * *